US007222115B2

(12) United States Patent
Knopf

(10) Patent No.: US 7,222,115 B2
(45) Date of Patent: May 22, 2007

(54) DEFINITION AND MAINTENANCE OF A TELEMETRY DATABASE DICTIONARY

(75) Inventor: William P. Knopf, Clarksville, MD (US)

(73) Assignee: The Johns Hopkins University, Baltimore, MD (US)

( * ) Notice: Subject to any disclaimer, the term of this patent is extended or adjusted under 35 U.S.C. 154(b) by 253 days.

(21) Appl. No.: 10/641,463

(22) Filed: Aug. 15, 2003

(65) Prior Publication Data

US 2004/0064437 A1    Apr. 1, 2004

Related U.S. Application Data

(60) Provisional application No. 60/404,012, filed on Aug. 16, 2002, provisional application No. 60/404,011, filed on Aug. 16, 2002.

(51) Int. Cl.
    *G06F 17/30* (2006.01)
(52) U.S. Cl. .................. 707/1; 709/203; 715/503
(58) Field of Classification Search ........... 345/440; 707/100, 1, 503, 10, 200; 715/503; 709/203
    See application file for complete search history.

(56) References Cited

U.S. PATENT DOCUMENTS

| 5,337,364 | A | 8/1994 | Fitch |
| 5,371,842 | A | 12/1994 | Easton et al. |
| 5,375,201 | A | 12/1994 | Davoust |
| 5,894,311 | A | 4/1999 | Jackson |
| 6,218,958 | B1 | 4/2001 | Eichstaedt et al. |
| 6,314,416 | B1 | 11/2001 | Schiefele |
| 6,529,217 | B1 | 3/2003 | Maguire, III et al. |
| 6,694,367 | B1 * | 2/2004 | Miesbauer et al. ......... 709/227 |
| 2001/0000964 | A1 | 5/2001 | Alexander |
| 2002/0030683 | A1 | 3/2002 | Alexander |
| 2002/0109685 | A1 | 8/2002 | Nakagawa et al. |
| 2002/0118192 | A1 | 8/2002 | Couckuyt et al. |
| 2002/0143829 | A1 * | 10/2002 | Rank et al. .................. 707/538 |
| 2002/0156727 | A1 * | 10/2002 | LeVake et al. ................ 705/39 |
| 2002/0194217 | A1 * | 12/2002 | Hoffman et al. ............ 707/503 |
| 2003/0058243 | A1 | 3/2003 | Faust et al. |

OTHER PUBLICATIONS

Edwin P. Kan, Process and Methodology of Developing Cassini G&C telemetry Dictionary, SPACEOPS '94, pp. 1-8.*
"Telemetry Definition and Processing (TDAP): Standardizing Instrumentation and EU Conversion Descriptions" I.F.T. 1997, by Daniel A. Campbell and Lee Reinsmith.
"Software Development of a Standardized User Interface for the HAFB Telemetry Ground Station" I.F.T. 1991, by Otto P. Seebold, Jr.

* cited by examiner

*Primary Examiner*—Shahid Alam
*Assistant Examiner*—Rezwanul Mahmood
(74) *Attorney, Agent, or Firm*—Benjamin Y. Roca

(57) ABSTRACT

A telemetry dictionary database includes a component for receiving spreadsheet workbooks of telemetry data over a web-based interface from other computer devices. Another component routes the spreadsheet workbooks to a specified directory on the host processing device. A process then checks the received spreadsheet workbooks for errors, and if no errors are detected the spreadsheet workbooks are routed to another directory to await initiation of a remote database loading process. The loading process first converts the spreadsheet workbooks to comma separated value (CSV) files. Next, a network connection with the computer system that hosts the telemetry dictionary database is established and the CSV files are ported to the computer system that hosts the telemetry dictionary database. This is followed by a remote initiation of a database loading program. Upon completion of loading a flatfile generation program is manually initiated to generate a flatfile to be used in a mission operations environment by the core ground system.

3 Claims, 2 Drawing Sheets

DEFINITION AND MAINTENANCE OF A TELEMETRY DATABASE DICTIONARY

CROSS REFERENCE TO RELATED APPLICATIONS

This application is related to and claims the benefit of U.S. Provisional Patent Application Ser. No. 60/404,012, filed Aug. 16, 2002 entitled "Timed Telemetry Definition System" and U.S. Provisional Patent Application Ser. No. 60/404,011, filed Aug. 16, 2002 entitled "Timed Assessment Plotting System".

STATEMENT OF GOVERNMENTAL INTEREST

This invention was made with Government support under Contract number NAS5-97179 awarded by the NASA. The Government has certain rights in the invention.

BACKGROUND

Specifying and maintaining spacecraft telemetry definitions has historically been an arduous task. As telemetry locations, mnemonics, conversions, and additional information are defined, they are assembled into a collection known as a telemetry dictionary. The definition in the telemetry dictionary ultimately provides a means for the ground system to appropriately decommutate and display spacecraft telemetry and additional ground system information (for example, ground support equipment status). The telemetry dictionary typically comprises a database of one or more formatted files or a series of tables in a database, depending on the ground system implementation. Population of the database typically involves manual entry of information into specific database tables through a form-based graphical user interface. Although this type of interface is effective, it is extremely time consuming, prone to entry errors, and provides rollbacks of limited use.

There is a need for an automated system for developing and maintaining telemetry dictionaries for spacecraft missions that is more efficient, accurate, saves valuable time, and is less prone to human error.

SUMMARY

For the National Aeronautics and Space Administration's (NASA) Thermosphere, Ionosphere, Mesosphere, Energetics and Dynamics (TIMED) mission, a new means of building and maintaining a telemetry dictionary has been developed. The TIMED Telemetry Definition System (TTDS) has improved the reliability of database updates by providing well-structured user-populated spreadsheets and a web-based interface to submit new or updated telemetry definitions. Users may submit telemetry workbooks via a web interface for cognizant members of the Mission Operations Team to review, promote for database inclusion, or demote due to errors or improper adherence to telemetry definition conventions.

The TTDS supports users at various controlled levels, allowing restricted access to Spacecraft and Integration and Test (I&T) Engineers (submit, status), with expanded access to Mission Operations Spacecraft Specialists (submit, status, review, reject, pending). All users have access to the current telemetry definition for download including access to configuration-managed archives of previous versions of the telemetry packet workbooks. The system bridges the user-definition of telemetry on a PC or Macintosh with the UNIX workstation database population.

While the present invention can certainly be applied to virtually any mission oriented project that utilizes a telemetry dictionary database, NASA's TIMED mission is used throughout this description as an illustration of the present invention. In no way is the present invention constrained or limited to the TIMED mission. One of ordinary skill in the art can readily adapt the concepts of the present invention to fit the needs of other missions utilizing telemetry databases.

Telemetry definition and maintenance is critical to the success of any mission. Raw telemetry data is generated by a spacecraft's subsystems and transmitted back to the ground as data packets via RF links. The data packets are then routed to the appropriate processing devices where they are decommutated, processed, and stored. The ground system decommutates and processes this raw telemetry data through the formats defined in the telemetry database dictionary. This processed telemetry can be accessed and used in a core ground system by those having a need for the information.

Early in the development of the TIMED Ground System, the Johns Hopkins University (JHU) Applied Physics Laboratory (APL) implemented a Commercial Off the Shelf (COTS) core ground system. The core ground system included a telemetry database for command and telemetry definition, with a forms interface by which Mission Operations and Integration and Test personnel could assemble and maintain the telemetry dictionary. The core ground system also provided software to extract the command and telemetry definitions from the database and translate them to a flat ASCII file. During the core ground system startup sequence, the user is prompted for the name of the flatfile to use for the session. This flatfile is then loaded to system memory on startup.

The population of the telemetry database was effective through this means, but was particularly time consuming. Commands were built through the forms interface as well, but there were substantially fewer commands than telemetry points, so the telemetry definition became the focus for an improvement. However, under the present invention command definitions can also be assembled and maintained in the same manner as telemetry definitions.

The present invention is characterized as a computer readable medium whose contents assemble and manage a telemetry dictionary database. The telemetry dictionary database resides on a host processing device having storage capabilities and a web-based interface and is used by a core ground system. The host processing device is communicable with other processing devices over a network via the web-based interface.

The software comprising the system of the present invention includes a component for receiving spreadsheet workbooks of telemetry data from the web-based interface from other computer devices communicable with the network. There is also a component that routes the spreadsheet workbooks to a specified directory on the host processing device. A process then checks the received spreadsheet workbooks for errors, and if no errors are detected the spreadsheet workbooks are routed to another directory to await initiation of a remote database loading process. This is performed by a component that initiates the remote database loading process that results in the converting and loading of error free spreadsheet workbooks into the telemetry dictionary database.

The loading process first converts the spreadsheet workbooks to comma separated value (CSV) files. Next, a network connection with the computer system that hosts the telemetry dictionary database is established and the CSV files are ported to the computer system that hosts the telemetry dictionary database. This is followed by a remote initiation of a database loading program. Upon completion of loading a flatfile generation program is initiated to generate a flatfile to be used in a mission operations environment by the core ground system.

The present invention also invokes the core ground system to test the flatfile in a simulated environment. There is also included an administrative component that associates a flatfile with the spreadsheet workbook, ports the accepted workbooks to a specified directory, updates a file relating to the status of accepted workbooks, and notifies appropriate users via e-mail of the updates to the telemetry dictionary database.

DETAILED DESCRIPTION

Throughout this description items in Italics refer to subdirectories in the present invention FTP Server architecture. Underlined items refer to software components of the present invention.

Figure 1:
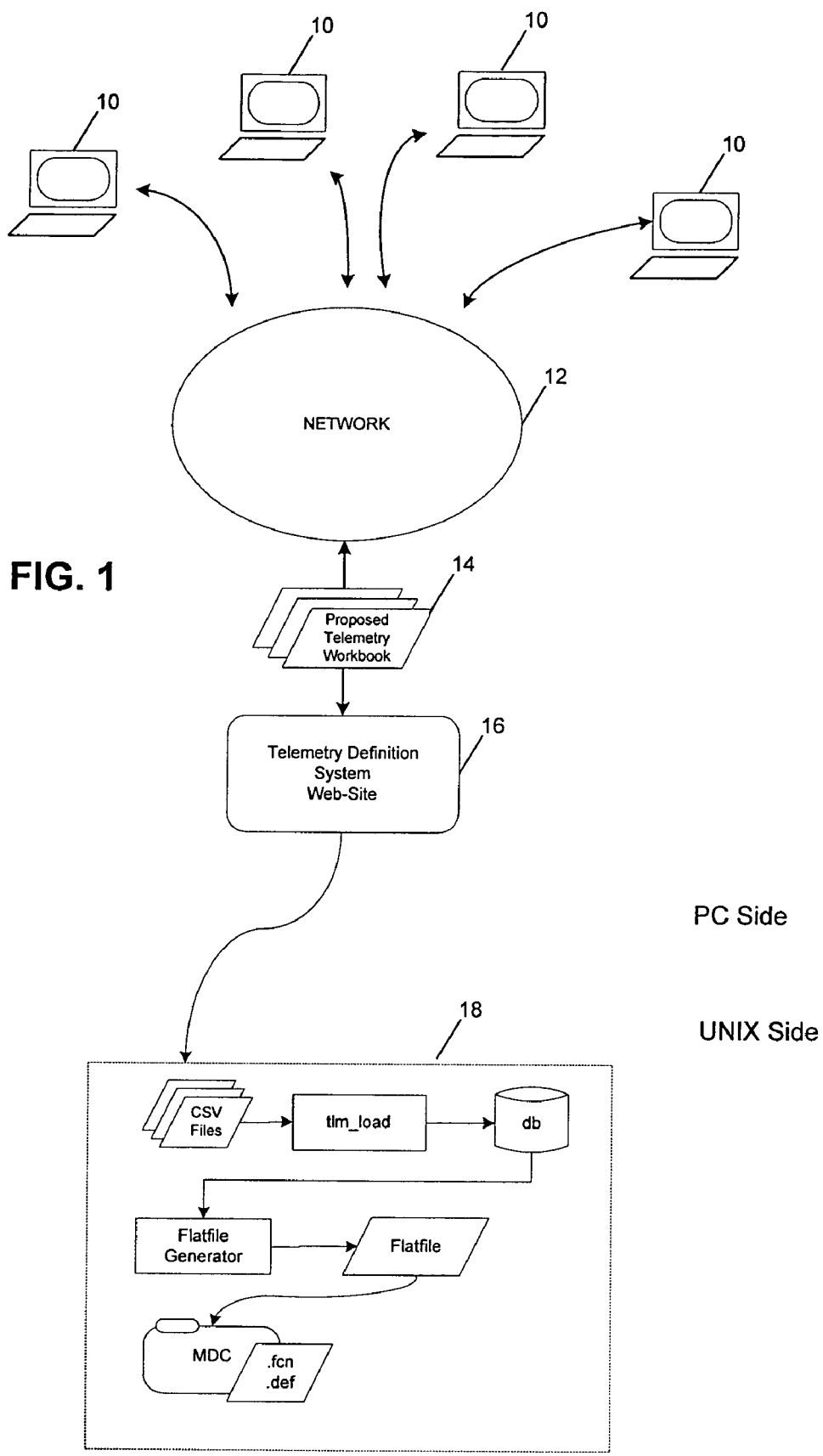
FIG. 1 illustrates a network diagram showing the components typically used to implement the present invention.

FIG. 1 is a network diagram of the components typically used to implement the present invention. Telemetry definition according to the present invention can be implemented over a distributed computer network. The engineering team can create spreadsheet workbooks 14 on a PC or Macintosh based machine 10. The PC machines 10 are communicable with a network 12 such as the Internet, a LAN, or the like that allows the PC machines 10 to submit their spreadsheet workbooks 14 to a web-based system 16 designed to receive and facilitate processing of the spreadsheet workbooks 14. In addition, the web-based system 16 also facilitates communication (via e-mail, instant messaging or the like) to and from mission personnel regarding the status of any given spreadsheet workbook 14.

The web-based system 16 is also in communication with the machine(s) 18 that host the telemetry definition database and can initiate the porting and entry of converted workbooks into the database.

While the illustration in FIG. 1 shows a Unix based environment that hosts the database, there is no requirement that the database be tied to a UNIX environment. Nor is there a requirement that the original spreadsheet workbooks be developed in a PC environment. The actual environments are irrelevant so long as the web-based system can communicate across platforms if necessary. Thus, references to FTP (file transfer protocol) or TELNET are convenient terms used to illustrate a means for moving data across networks to machines on different platforms. The present invention does not restrict itself to any particular data transfer mechanism.

Figure 2:
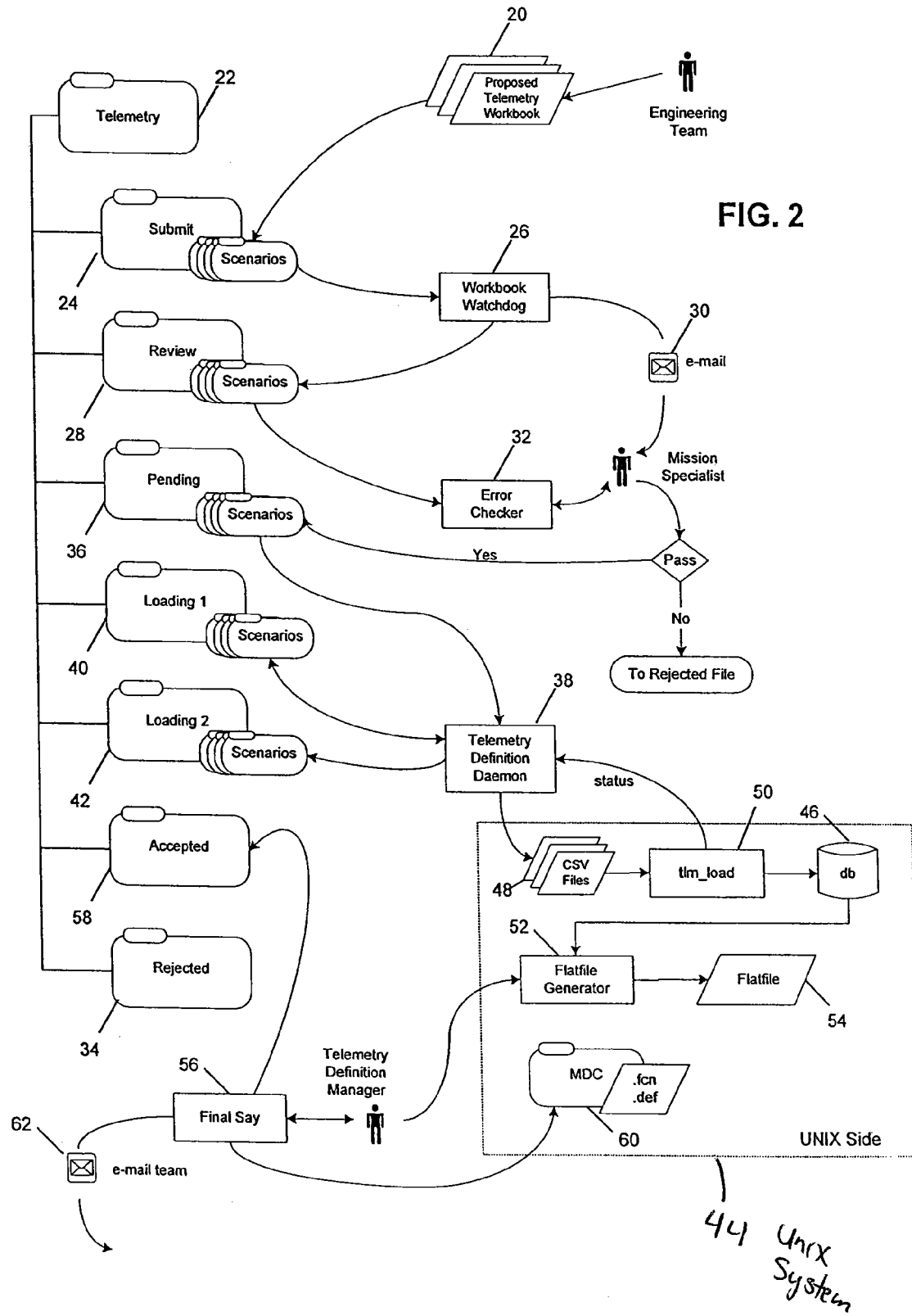
FIG. 2 is a logic diagram that follows the path of data as it makes its way through the components illustrated in FIG. 1.

FIG. 2 illustrates a logic diagram that follows the path of data as it makes its way through the components illustrated in FIG. 1. First, telemetry definitions are entered into a spreadsheet program such as, for instance, a Microsoft Excel workbook, by members of the engineering team. The spreadsheet is initially a proposed telemetry workbook 20.

The engineering team implemented packetized telemetry, and more specifically fixed length packets. This too is a design choice that can be varied from mission to mission and is not intended to limit the scope of the present invention. Each telemetry packet was assigned a unique Application ID (APID). As a result, the definition of each APID was through its own telemetry workbook. The workbook comprises seven distinct worksheets. The type of information provided in each worksheet, including the worksheet name (in parenthesis) is described below.

Basic (BASI)—This worksheet contains basic information about telemetry points within the APID packet, including the telemetry mnemonic, a description of the telemetry point, data type (signed, unsigned, byte_array, etc.), units (deg, poly, hex, state, etc.) and conversion (hex, state, poly, time, etc.). The mnemonics are repeated throughout the other sheets of the APID's workbook.

Location (LOCA)—This worksheet includes the starting byte, starting bit and the number of bits to define the telemetry point. Additional decommutation information is included on this sheet, such as related context points and values for subcommutated telemetry.

State (STAT)—This worksheet includes state values and their related state messages (for example, 0=OFF, 1=ON), including context-relevant switch points.

Calibration Pairs (CALP)—This worksheet includes calibration information (both raw and engineering units) in a piece-wise linear fashion (for example, raw data values between A and B should use the calibration X, raw data values between B and C should use the calibration Y, etc.).

Calibration Coefficients (COEF)—This worksheet uses polynomial coefficients for calibration of the raw telemetry data.

Alarm (ALAR)—This worksheet includes green, yellow, and red alarm limits for the telemetry points in the packet, switch points, and range (inclusive, exclusive).

User (USER)—This worksheet contains general user comments pertinent to the APID.

A web-based system was devised to monitor the incoming telemetry workbooks 20 from the engineering team and facilitate their loading to the database. To provide a focal point for the process, a web-based interface was created to provide a remote input drop-box for submission of proposed telemetry workbooks 20. The web-based interface also contains links to documentation, account requests, status information, and tools to assist in the workbook creation process. Among other things, FIG. 2 illustrates a directory hierarchy 22 of the web-based interface. The engineering team has limited write access to this directory structure and can only submit workbooks to the scenario(s) under the submit directory 24.

A process called the Workbook Watchdog 26 monitors for proposed telemetry workbook submissions 20 to the submit directories 24. Upon workbook arrival, Workbook Watchdog 26 determines which system the APID is associated with and looks up a list of cognizant Mission Operations members who need to be notified of the submission. The Workbook Watchdog 26 then moves the workbook to the appropriate scenario in a review directory 28 and sends an e-mail 30 to the appropriate mission specialist. In addition, the Workbook Watchdog 26 may be configured to sound an audible alert in the Mission Operations Center to indicate an APID is ready for review.

The review process includes a checkpoint where Mission Operations oversight provides coordinated validation of workbooks submitted by the engineering team via a software tool called the Error Checker 32. If the Mission Specialists cannot resolve the errors, the workbook is moved to a rejected directory 34 and notification is sent to the submitter of the workbook. If no errors are found, the workbook is moved to the appropriate scenario in a pending directory 36.

Once a workbook is placed in the pending subdirectory 36, a Telemetry Definition Daemon 38 (or TDD) begins the process that ultimately loads the definitions into the database. During this process, the workbook and additional generated components are moved through the corresponding scenario subdirectories under loading 40 and loading2 42 using components of the Telemetry Definition Daemon 38 called the Controller and Shelled.

First, the seven worksheets within the workbook are saved as CSV files 48. Next, a telnet session is initiated by the Shelled component with the UNIX system 44 where the database 46 resides. The CSV files 48 are sent via Shelled using FTP to the Unix system, where a filtering process (a program called Filter) further refines the contents of the files for consistency during the database load process. For example, it is acceptable to have a single mnemonics record on the STAT sheet of the workbook, followed by multiple state entries without an explicit mnemonic name. This allows for a visually easier worksheet for the user to navigate. Filter adds this mnemonic to all related records in the CSV file for proper loading to the database.

Once Filter has completed execution, the Telemetry Definition Daemon 38 checks to see if tlm load 50 is ready to begin. The tlm load program 50 is run in series, since only one instance of it can run at a time. The Telemetry Definition Daemon 38 serves as a gatekeeper to monitor tlm load 50 and process a queue of awaiting workbooks. If tlm load 50 is not running, then the Telemetry Definition Daemon 38 may start it through the Shelled telnet session. The custom telnet client portion of Shelled is visible on the Telemetry Definition PC in the Mission Operations Center, and can be viewed at any time to see status of the loading process. Status information from tlm load 50 is displayed on the Shelled telnet client window and is monitored by other portions of the Telemetry Definition Daemon 38. Upon completion of tlm load 50, the Telemetry Definition Daemon 38 will cycle back to the pending subdirectories 36 to look for more workbooks, and the process repeats itself. This allows for a quantity of workbooks to be processed throughout the day in an unattended mode.

A Load Log Checker, another software component, analyzes the status information that is produced by the Telemetry Definition Daemon 38. The Telemetry Definition Manager (an oversight role performed by the Mission Operations Manager) reviews this information. Any errors encountered in the database load process are called out in this log. This allows Mission Operations personnel to either correct the error (and resubmit and corrected APID workbook) or reload the previously accepted version of the APID workbook.

Once all submitted workbooks are processed during a session, the Telemetry Definition Manager locks access to the database and initiates the generation of a command and telemetry flatfile. The flatfile generation process 52 is provided by an external program and is command line initiated.

Upon successful completion of flatfile generation 52 resulting in a flatfile 54, the Telemetry Definition Manager uses the core ground system in the TIMED simulator environment to test the flatfile 54. The core ground system streams are started and connected to the TIMED Operations Simulator (TOPS), which is a hardware-in-the-loop simulator consisting of engineering model spacecraft components coupled with space environment simulated inputs. These simulated inputs include a GPS simulator, the TIMED Attitude System Test and Integration Environment (TASTIE), and a testbed providing simulated telemetry from the onboard instruments.

After successful test, and the approval of the TIMED Configuration Control Board (CCB), the flatfile 54 (and ancillary files generated during the process) are moved to the operational environment. The Telemetry Definition Manager then releases the new flatfile 54 for operational use by the Mission Operations Team.

To complete the acceptance process, the Telemetry Definition Manager utilizes another component of the Telemetry Definition System called The Final Say 56. This software component is used to associate the processed telemetry workbooks with the newly generated and released flatfile 54. Upon association, The Final Say 56 performs a number of tasks. The workbooks that have been successfully processed are moved to the accepted directory 58, and an indexed file of accepted workbooks is updated for each related scenario. This file may be accessed from the Telemetry Definition Web page to retrieve the most recent workbook for a given APID/scenario, and is the starting point for future updates to the telemetry definition.

The Final Say 56 also sends the new telemetry definitions to the instrument community through the TIMED Mission Data Center (MDC) 60. The CSV files are renamed with a def extension (to indicate definition files), and a .fcn (file change notification) file is created. The def and .fcn files are then sent via FTP to an MDC system that is accessible externally. This provides access for members of the instrument teams located at other TIMED Payload Operations Centers (POCs). These POCs interpret the files and update their ground system components accordingly to properly decommutate TIMED telemetry data.

Another feature of The Final Say 56 is e-mail notification 62 of appropriate TIMED personnel based on APID groupings. A PC-resident database of APIDs relates groups of team members that need to be notified upon successful promotion of new telemetry workbook(s) for approved use, or to signal rejection of the workbook(s). For example, notification for workbooks pertaining to G&C will be sent to members of the G&C team and others people listed as "Notify-G&C" in the database notification table.

It is to be understood that the present invention illustrated herein is readily implementable by those of ordinary skill in the art as a computer program product having a medium with computer program(s) embodied thereon. The computer program product is capable of being loaded and executed on the appropriate computer processing device(s) in order to carry out the method or process steps described. Appropriate computer program code in combination with hardware implements many of the elements of the present invention. This computer code is typically stored on removable storage media. This removable storage media includes, but is not limited to, a diskette, standard CD, pocket CD, zip disk, or mini zip disk. Additionally, the computer program code can be transferred to the appropriate hardware over some type of data network.

The present invention has been described, in part, with reference to flowcharts or logic flow diagrams. It will be understood that each block of the flowchart diagrams or logic flow diagrams, and combinations of blocks in the flowchart diagrams or logic flow diagrams, can be implemented by computer program instructions.

These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks or logic flow diagrams.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart blocks or logic flow diagrams. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart blocks or logic flow diagrams.

Accordingly, block(s) of flowchart diagrams and/or logic flow diagrams support combinations of means for performing the specified functions, combinations of steps for performing the specified functions and program instruction means for performing the specified functions. It will also be understood that each block of flowchart diagrams and/or logic flow diagrams, and combinations of blocks in flowchart diagrams and/or logic flow diagrams can be implemented by special purpose hardware-based computer systems that perform the specified functions or steps, or combinations of special purpose hardware and computer instructions.

In the following claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A computer readable medium whose contents assemble and manage a telemetry dictionary database on a host processing device having storage capabilities and a web-based interface, wherein the telemetry database dictionary is used by a core ground system, and the host processing device is communicable with other processing devices over a network via the web-based interface, the computer readable medium comprising:
   a component for receiving spreadsheet workbooks via said web-based interface from other computer devices communicable with the network, the spreadsheet workbooks comprised of telemetry data definitions;
   a component for routing said spreadsheet workbooks to a specified directory on the host processing device;
   a component for checking the received spreadsheet workbooks for errors, and if no errors are detected the spreadsheet workbooks are routed to another directory to await initiation of a database loading process; and
   a component for initiating a remote database loading process that results in the converting and loading of error free spreadsheet workbooks into the telemetry dictionary database,
   wherein the remote database loading process comprises:
      converting the spreadsheet workbooks to comma separated value (CSV) files;
      establishing a network connection with the computer system that hosts the telemetry dictionary database;
      porting the CSV files to the computer system that hosts the database: and
      remotely initiating the execution of a database loading program.
   further comprising a component for remotely initiating a flatfile generation program to generate a flatfile to be used in a mission operations environment.
   wherein the remote database loading process further comprises:
      invoking the core ground system to test the flatfile generated in a simulated environment.
   wherein the remote database loading process further comprises:
      a filter component that refines the telemetry data for consistency during the database loading process.
   further comprising an administrative component that:
      associates a flatfile with the spreadsheet workbook;
      ports the accented workbooks to a specified directory;
      updates a file relating to the status of accented workbooks; and
      notifies appropriate users via e-mail of the updates to the telemetry dictionary database,
   wherein command data is substituted for telemetry data.

2. A method of assembling and managing a telemetry dictionary database on a host processing device having storage capabilities and a web-based interface, wherein the telemetry database dictionary is used by a core ground system, and the host processing device is communicable with other processing devices over a network via the web-based interface, the method comprising:
   receiving spreadsheet workbooks via said web-based interface from other computer devices communicable with the network, the spreadsheet workbooks comprised of telemetry data definitions;
   routing said spreadsheet workbooks to a specified directory on the host processing device;
   checking the received spreadsheet workbooks for errors, and if no errors are detected the spreadsheet workbooks are routed to another directory to await initiation of a database loading process; and
   initiating a remote database loading process that results in the converting and loading of error free spreadsheet workbooks into the telemetry dictionary database,
   wherein the remote database loading process comprises:
      converting the spreadsheet workbooks to comma separated value (CSV) files;
      establishing a network connection with the computer system that hosts the telemetry dictionary database;
      porting the CSV files to the computer system that hosts the database; and
      remotely initiating the execution of a database loading program,
   further comprising a component for remotely initiating a flatfile generation program to generate a flatfile to be used in a mission operations environment,
   wherein the remote database loading process further comprises:
      invoking the core ground system to test the flatfile generated in a simulated environment,
   wherein the remote database loading process further comprises:
      a filter component that refines the telemetry data for consistency during the database loading process,
   further comprising an administrative component that:
      associates a flatfile with the spreadsheet workbook;

ports the accepted workbooks to a specified directory;
updates a file relating to the status of accepted workbooks; and
notifies appropriate users via e-mail of the updates to the telemetry dictionary database,
wherein command data is substituted for telemetry data.

3. A computer based system for assembling and managing a telemetry dictionary database comprising:
a host processing device communicable over a network with remote processing devices via a web-based interface and further communicable with a computer system upon which resides the telemetry dictionary database, the host processing device further comprising software capable of:
receiving spreadsheet workbooks via said web-based interface from the remote processing devices over the network, the spreadsheet workbooks comprised of telemetry data definitions;
routing said spreadsheet workbooks to a specified directory on the host processing device;
checking the received spreadsheet workbooks for errors, and if no errors are detected routing the spreadsheet workbooks to another directory to await initiation of a database loading process; and
initiating a remote database loading process on the computer system upon which resides the telemetry dictionary database that results in the converting and loading of error free spreadsheet workbooks into the telemetry dictionary database,
wherein the remote database loading process comprises:
converting the spreadsheet workbooks to comma separated value (CSV) files;
establishing a network connection with the computer system that hosts the telemetry dictionary database;
porting the CSV files to the computer system that hosts the database; and
remotely initiating the execution of a database loading program,
wherein the host processing device software is further capable of remotely initiating a flatfile generation program to generate a flatfile to be used in a mission operations environment,
wherein the remote database loading process further comprises:
a filter component that refines the telemetry data for consistency during the database loading process,
wherein the host processing device software further comprises an administrative component that:
associates a flatfile with the spreadsheet workbook;
ports the accepted workbooks to a specified directory;
updates a file relating to the status of accepted workbooks; and
notifies appropriate users via e-mail of the updates to the telemetry dictionary database,
wherein command data is substituted for telemetry data.

* * * * *